United States Patent [19]

Mester et al.

[11] Patent Number: 5,166,834
[45] Date of Patent: Nov. 24, 1992

[54] METHOD AND APPARATUS FOR SLOW-MOTION PLAYBACK OF DIGITAL VIDEO SIGNALS

[75] Inventors: Roland Mester, Darmstadt; Berthold Eiberger, Ober-Ramstadt, both of Fed. Rep. of Germany

[73] Assignee: BTS Broadcast Television Systems GmbH, Darmstadt, Fed. Rep. of Germany

[21] Appl. No.: 577,322

[22] Filed: Sep. 4, 1990

[30] Foreign Application Priority Data

Sep. 13, 1989 [DE] Fed. Rep. of Germany ....... 3930591

[51] Int. Cl.$^5$ .................... H04N 5/78; G11B 15/14
[52] U.S. Cl. .................................. 360/10.3; 360/64
[58] Field of Search ............. 358/312, 335; 360/10.1, 360/10.3, 64, 73.08, 73.13

[56] References Cited

U.S. PATENT DOCUMENTS

| | | | |
|---|---|---|---|
| 4,486,792 | 12/1984 | Edakubo et al. | 360/64 |
| 4,623,940 | 11/1986 | Matsumoto et al. | 358/312 |
| 4,680,651 | 7/1987 | Blessinger | 360/38.1 |
| 4,939,605 | 7/1990 | Heitmann et al. | |

OTHER PUBLICATIONS

Translation of article by Jürgen Heitmann, "Der digitale Videorecorder—Entwurf des elektrischen Teils des Standards [Digital Video Recorders—Design of the Electrical Portion of the Standard]", published by Fernseh- und Kino-Technik, vol. 41, No. 1, 1987.
Translation of table of contents and pp. 36 and 37 of monograph by Dr. Roland Best, Theory of Employment of Phase-locked Loops (3d rev. ed., 1982, A. T. Verlag, Aarau Switzerland).
Tech. 3245-E, European Broadcast Union, 2nd Edition, Dec. '86, "Remote-Control System for Broadcasting Production Equipment".
Fernseh- Und Kino-Technik, 1987, pp. 15-22.
Theorie und Anwendungen des Phase-locked Loops, by R. Best.

Primary Examiner—Aristotelis Psitos
Assistant Examiner—Varsha V. Sheladia
Attorney, Agent, or Firm—Frishauf, Holtz, Goodman & Woodward

[57] ABSTRACT

For reliable playback of digital video signals in slow-motion operation over a wide range of slow-motion speeds, auxiliary playback heads are positioned closely behind normal playback heads and offset by half a track width therefrom. Each of the playback heads have a circuit for regenerating clock and data signals which includes a PLL circuit and all of the PLL circuits have an output for the signal that shows whether the PLL circuit is locked in or not. The lock-in signals are supplied to first address inputs of an ROM which has a principal output showing whether the normal playback heads or the auxiliary playback heads have the larger number of locked-in PLL circuits and the group of playback heads having that larger number of locked-in PLL circuits is selected for having the data and clock signal outputs passed on to playback channels for further processing. The control of the switching circuit is improved by having auxiliary outputs of the ROM fed back to second address inputs thereof.

6 Claims, 2 Drawing Sheets

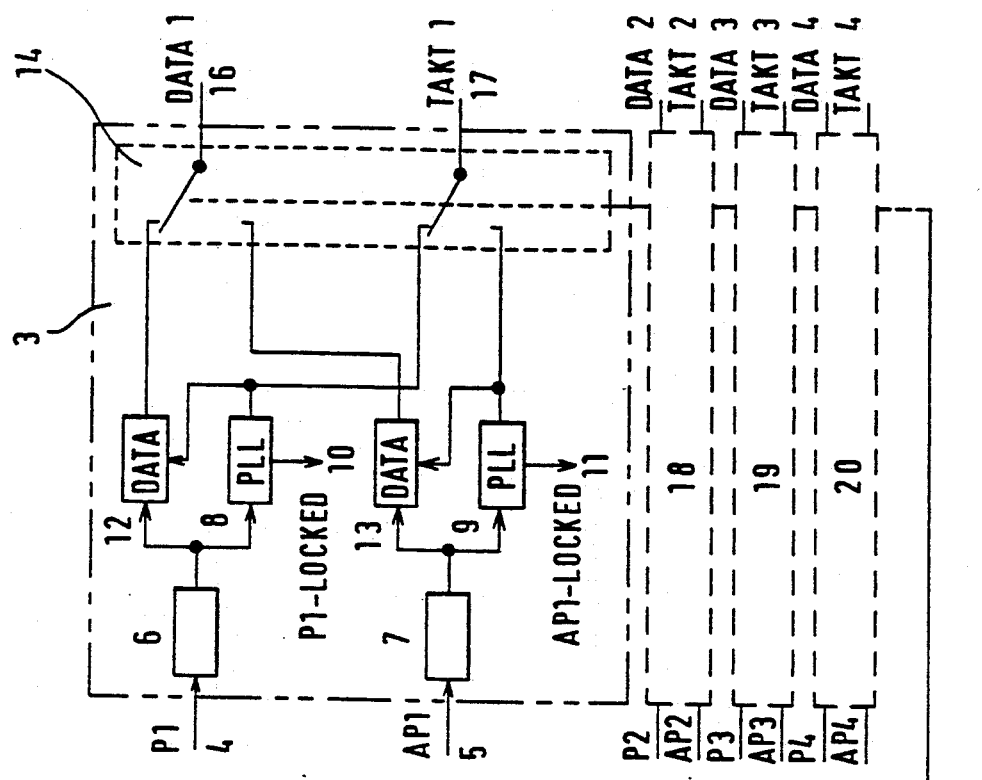
FIG. 2
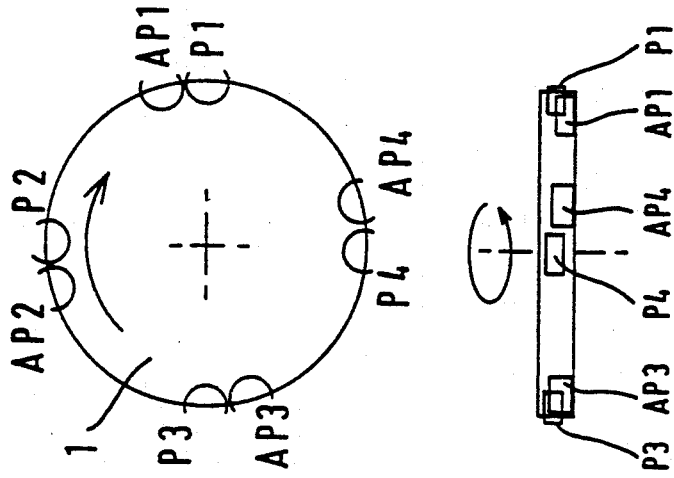
FIG. 1A
FIG. 1B

METHOD AND APPARATUS FOR SLOW-MOTION PLAYBACK OF DIGITAL VIDEO SIGNALS

This invention concerns of playback of digital video signals recorded on magnetic tape at a speed lower than the speed at which the signals were recorded. The magnetic tape is helically looped in a magnetic recording and playback apparatus so that it can be obliquely scanned by a rotary headwheel. The rotary headwheel carries normal playback magnetic heads and auxiliary playback magnetic heads on its periphery, the auxiliary playback heads being offset in their track position with respect to corresponding normal playback heads. The magnetic tape recording and playback device in question has an adjustment by which the tape transport speed in playback can be made smaller than the speed that was used in recording, while in playback at such speeds the so-called clock signals and the data signals can be regenerated in step with the signals picked up from the tape by the playback heads.

In a known method of magnetic recording and playback of digital television signals it is possible to reduce the data rate at each video magnetic head by subdividing the data stream by distributing the data into four channels. For recording and playback, then, sets of four evenly spaced magnetic heads are provided, each set distributed around the periphery of a headwheel. The four recording magnetic heads follow each other in contact with the magnetic tape helically looped around the head wheel and describe tracks running obliquely to the longitudinal axis of the tape. In the middle portion of each track are short track sections which contain audio information.

The details of this known method are described in the publication "Standard for Recording Digital Television Signals on Magnetic Tapes and Cassettes" of the European Broadcasting Union, Tech. 3252-E, and in the periodical "Fernseh- und Kinotechnik", 1987, issue 1/2, pp. 15–22. The system for playback of audio signals which are recorded as digital signals in the track sections provided for them, in the tracks that otherwise serve for digital video signals, is known from German Patent 37 44 077. In this system four "normal" playback magnetic heads are mounted on a rotary head wheel and also four auxiliary magnetic heads, each of the Catter passing ahead of the corresponding recording heads in crossing the tape, so that the tracks recorded on the magnetic head are scanned by them sooner than by the corresponding recording magnetic heads. The track positions are so chosen in this case that the advanced or auxiliary playback magnetic heads are positioned in a first plane of the head wheel, the recording magnetic heads in a second plane of the head wheel and the normal playback magnetic heads in a third plane of the head wheel. In this way processing of audio signals can be carried out, so that recorded audio signals can be played back, processed and immediately re-recorded on the same magnetic tape.

If the oblique tracks recorded on the magnetic tape are scanned for playback with a magnetic tape transport speed differing from the recording speed, the playback tracks no longer coincide with the recording tracks. The playback magnetic heads then cross the recorded oblique tracks at various angles according to the magnetic tape transport speed and the direction of tape transport.

Trouble-free slow-motion or fast-motion playback is not possible without special provisions. It is therefore common to control the playback magnetic heads with actuators so that the playback magnetic head will follow the recorded oblique track. Since the range of displacement by the actuators is very small, however, this dynamic tracking system cannot be used for several successive oblique tracks.

It is known from German Patent 38 05 436 to shift the track position of the auxiliary playback heads relative to the track position of the normal playback heads by about half a track width. According to the error rate in the played back data signals the signal paths are switched over between the normal or main playback heads and the auxiliary magnetic heads respectively corresponding to them. This known method has the disadvantage, however, that the error rate switch-over criterion is, on the one hand, subject to errors itself and, on the other hand, reacts only very slowly to deviation from a recording track as a result of the formatting of recorded video data in fairly long data blocks. The tape speed range for a slow-motion playback is therefore limited.

SUMMARY OF THE INVENTION

It is an object of the present invention to develop a method of the general kind outlined above in which the tape speed range in slow-motion playback can be greatly extended in a simple way.

Briefly, an auxiliary playback magnetic head is correlated with each normal or main playback magnetic head and is offset by about half a track width with respect to the track position of the normal playback magnetic head and fixed in position on the rotary carrier of the magnetic heads. For clock pulse regeneration, phase-locked loop (PLL) circuits are used for the signals picked up by the normal and auxiliary playback magnetic heads and these circuits respectively provide signals designating the lock-in of the PLL circuits. The lock-in conditions of the respective PLL circuits, indicated by the lock-in signals, are subjected to a plurality decision procedure from the result of which there is derived a control signal for switch-over between the clock and data signals of the normal magnetic heads and the clock and data signals of the auxiliary magnetic heads.

The invention has the advantage that the normal and auxiliary magnetic heads can all be fixedly positioned on the periphery of the rotary body that carries all the magnetic heads. It is no longer necessary to provide supplementary guidance or mechanical shifting of the track position of the playback magnetic heads. The switching over of the signal paths is carried out on the basis of simple majority-decision logic signals derived from the lock-in states of PLL circuits for clock pulse regeneration. The capture range of the PLL circuits serve to provide hysteresis in order to allow drop-out disturbances to be ignored in the data signals picked up from the tape.

It is particularly advantageous for the plurality or majority decision of the signals designating the lock-in condition of the PLL circuits to be carried out with a read-only memory (ROM) having a feedback connection. The feedback connection provides protection of the played back data signals against transient disturbances.

BRIEF DESCRIPTION OF THE DRAWINGS

The invention is further described by way of illustrative example with reference to the annexed drawings, in which:

FIG. 1A is a top view of a headwheel having normal and auxiliary playback magnetic heads affixed to its periphery;

FIG. 1B is a side elevation view of the headwheel of FIG. 1;

FIG. 2 is a block circuit diagram of apparatus for explaining the operation of the method of the invention.

DESCRIPTION OF THE ILLUSTRATED EMBODIMENT

Figure 3:
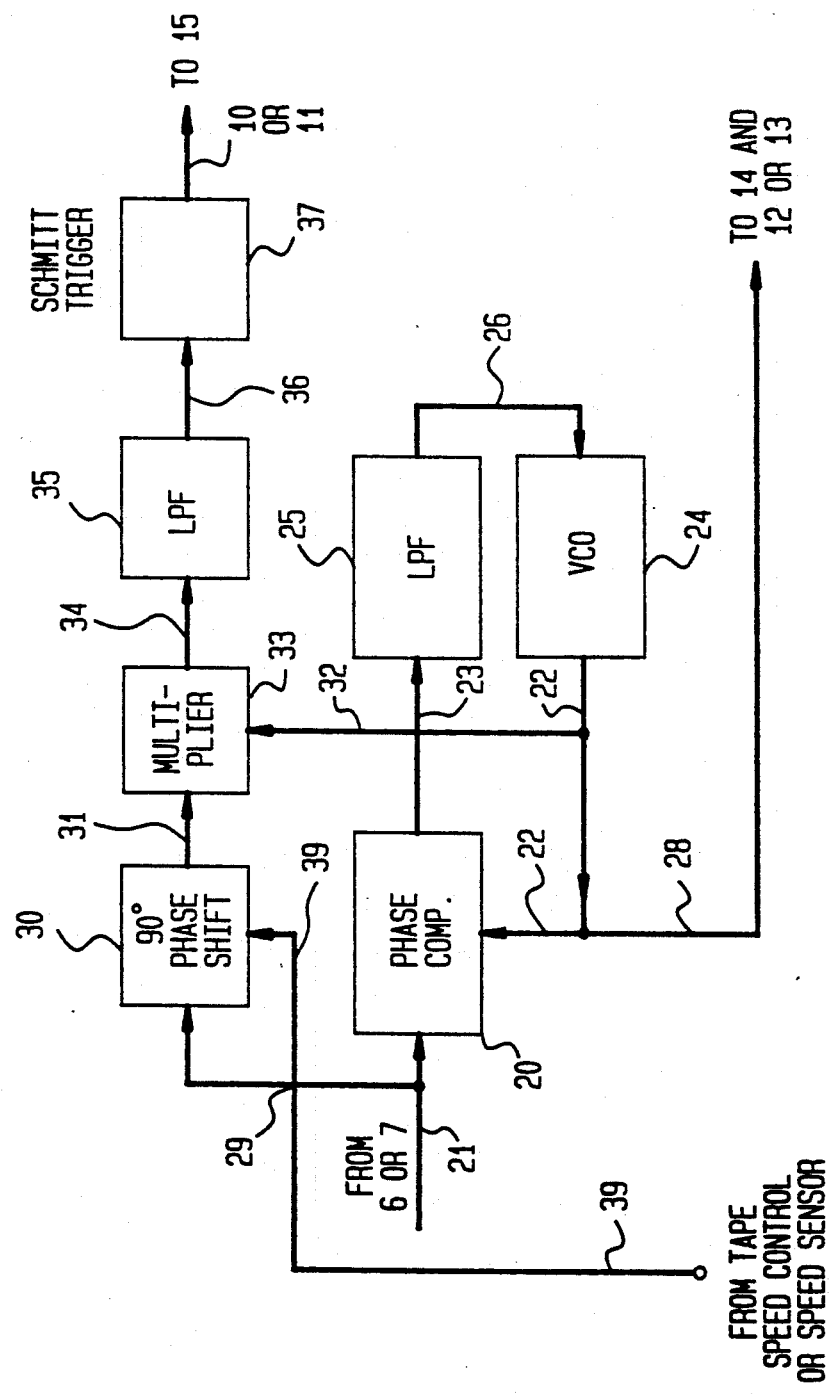
FIG. 3 is a block circuit diagram of a phase-locked loop circuit showing an output designating a locked-in condition of the phase-locked loop.

In the top view given in FIG. 1 there is shown a rotary carrier or head wheel on the periphery of which four normal playback magnetic heads P1, P2, P3 and P4 are affixed at an angular spacing of 90° each from the next. The auxiliary playback heads AP1 to AP4, revolving in the direction of the arrow 2, follow, at the same angular spacing, the respective normal playback magnetic heads P1, P2, P3 and P4. The track position of the auxiliary playback heads AP1 to AP4 is offset by half a track width from the track position of the normal playback heads P1 to P3. The FIG. 1B side view shows this offset in the track position. In the illustrated example the auxiliary playback heads AP1 to AP4 are located directly next to the respective normal playback heads P1 to P4, but offset with respect to the latter by half a track width.

If the tape transport speed of a tape in playback operation looped helically about the headwheel is the same as the tape transport speed of the tape in recording operation, the normal playback heads P1 to P4 exactly scan the recorded oblique tracks. If the tape transport speed in playback operation deviates from the speed used for recording, however, the normal playback heads depart from the recorded oblique tracks and get into the so-called border regions between the oblique tracks. The signal-to-noise ratio of the data signals picked up from the tape deteriorates as the playback heads get into the border region, so that the corresponding PLL circuits provided for clock pulse regeneration fall out of step and unlock the loop. In this case a switch-over is performed to the auxiliary playback heads AP1 to AP4 which are offset by half a track width, which now can better scan the oblique tracks which the normal playback heads P1 to P4 have just left.

A circuit block diagram for further explanation of the invention is shown in FIG. 2. A playback channel 3 as shown in chain-dotted lines receives at a terminal 4 the data signal picked up from the tape by the normal playback head P1 and receives at a terminal 5 the data signal picked up from the tape by the auxiliary playback head AP1. In stages 6 and 7 the data signals picked up from the tape are first preamplified and compensated for distortion. The data signals so prepared are then supplied to a PLL circuit, respectively 8 and 9, for clock pulse regeneration. When there is adequate signal-to-noise margin of the data signals picked up from the tape, the PLL circuit 8 or 9 locks in, the PLL circuit 8 providing a corresponding P1-locked signal at a terminal 10 and the PLL circuit 9 providing an AP1-locked designation signal at a terminal 11. Normally only one of the circuit 8 and 9 is locked in at any particular time, since one of the two playback heads in question usually is in a border region between two neighboring oblique tracks.

The regenerated clock pulses are then supplied to respective stages 12 and 13 in which the data signals corrected for distortion are put into a corresponding clocked sampling pattern with the assistance of the regenerated clock pulses. These clock pulses are also supplied to contacts of a controlled change-over switch 14. The data signals available at the outputs of the stages 12 and 13 are supplied to other contacts of the controlled change-over switch 14. The control of this switch is performed by a control signal which is made available at an output D0 of a read-only memory (ROM) 15.

According to the level of the control signal at D0 there is made available, at an output terminal 16, either the data signal from the stage 12 or that from the stage 13, the selected data signal being designated DATA 1 in FIG. 2. In parallel with the selection of a data signal by the change-over switch 14 there is a selection of the regenerated clock pulses, so that at an output terminal 17 a regenerated clock signal CL 1 is made available which is regenerated either by the PLL circuit 8 or by the PLL circuit 9.

In a manner corresponding to what has just been explained for the playback channel 3, playback channels 18, 19 and 20 are provided respectively for the pairs of playback heads P2-AP2, P3-AP3 and P4-AP4. These channels respectively provide data signals DATA 2, DATA 3 and DATA 4 and likewise clock signals CL 2, CL 3 and CL 4.

The lock-in recognition signals respectively provided by the PLL circuits of the several playback channels are supplied to the address inputs A0 to A7 of the ROM 15. Additional address inputs An are connected with the data outputs Dn of the ROM 15. The program of the ROM 15 is so constituted that the states of the respective PLL circuits of the several playback heads are simultaneously observed and a plurality or majority decision is carried out on the basis of the logic states of the respective lock-in signals. More particularly, if the lock-in signals show that more PLL circuits of the normal playback heads are locked in and PLL circuits of the auxiliary playback heads, there is a decision in favor of the normal playback heads and the change-over switch 14 connects the data obtained by the normal playback heads to the respective further signal processing circuits (not shown), to the exclusion of the data signals obtained by the auxiliary playback heads. Conversely, the data and clock signals derived from the auxiliary selected playback heads are passed through the switch 14 to further processing circuits when more of their corresponding PLL circuits are locked in than the number of locked-in PLL circuits serving the normal playback heads. The D0 output of the ROM 15 is latched so that it is not changed when the number of locked-in PLL circuits is the same for normal and auxiliary playback head outputs. This effect can be provided by the feedback connections between the ROM outputs $D_n$ and the ROM inputs $A_n$.

The capture region or range of the individual PLL circuits serves in this connection to provide hysteresis for protection against disturbances of data signals played back from the tape. Furthermore, in connection with the three feedback circuits of the ROM 15 eight internal states are provided which operate to reinforce hysteresis on the locking of the eight PLL circuits. Error-containing data of a single playback magnetic head thus cannot upset a decision of the ROM 15 in the case of a drop-out. This applies particularly to effects of scanning the border region between the oblique tracks. The unambiguous decision of the control of the switch 14 prevents any "ringing" of the control signal produced by the ROM 15.

FIG. 3 is a block circuit diagram of one of the identical phase locked loop circuits 8 and 9 of FIG. 2. The phase locked loop itself is composed of a phase comparator 20, a low pass filter 25 and a voltage controlled oscillator 24. A clock pulse frequency signal, separated so far as possible from the output of a magnetic head, is furnished over the line 21 from the preamplifier 6 or 7 of FIG. 1 to one input of the phase comparator 20. The output of the voltage controlled oscillator 24 is supplied to a second input of the phase comparator 20 through the connection 22. The output of the phase comparison circuit 20 is supplied through the connection 23 to the low pass filter 25, the output of which is delivered as a control signal for the voltage controlled oscillator 24 in the usual way by the connection 26. The low pass filter can be a resistance-capacitance filter. The output of the voltage controlled oscillator 24 is also supplied through the connection 28 to contacts of the switch 14 and to the data recovery circuit 12 or 13 of FIG. 1.

The input to the phase comparator 20 from the preamplifier 6 or 7 is also connected through the connection 29 to the input of a 90° phase shift circuit. Since for any given tape speed the clock signal frequency changes only over a narrow range, the phase shift circuit 30 may be implemented by a delay circuit providing a delay of one quarter of the expected mean period of the clock pulse. The delay provided by the phase shifter 30 must then be controlled by the tape speed control or by a tape speed sensor connected to the line 39 of FIG. 3.

If the waveform of the input signals is rounded (i.e. sinusoidal), the 90° phase shift can be produced by a differentiating circuit. In this case the tape speed affects only the amplitude of the differentiator circuit's output, which can be compensated for.

The output of the phase shift circuit 30 is supplied to a first input of the multiplier 33 through the connection 31, while the output of the voltage controlled oscillator 24 is supplied through the connection 32 to a second input of the multiplier 33. The output of the multiplier 33 is supplied over a connection 34 to the low pass filter 35, the output of which is supplied through the connection 36 to a Schmitt trigger circuit 37.

When the input signal on the line 21 is relatively undisturbed and consistent, the output of the voltage controlled oscillator 24 is put into step with the incoming signal 21. As a result, the inputs to the multiplier over the respective connections 31 and 32 will be 90° out of phase, so that the output of the multiplier over the line 34 will be at a minimum value, at or close to zero. The low pass filter 35 at this time eliminates undesirable transients. The output connection of the Schmitt trigger 37 circuit is so selected that in this condition the output provides a positive output at the line 10 or 11 to indicate that the phase locked loop circuit is locked in.

When the input signal over the line 21 to the phase comparator 20 is disturbed by noise or is otherwise made uncertain as to a clock frequency, the voltage controlled oscillator fails to keep in step with whatever incoming clock signal reaches the phase comparator 20, so that most of the time it will be substantially less than 90° out of phase with the input over the line 31 to the multiplier 33. In consequence a substantial output voltage will appear much of the time at the connection 34 between the multiplier 33 and the low pass filter 35 will produce from that input a steady voltage substantially different from zero at the connection 36. This voltage will exceed the switching threshold of the Schmitt trigger circuit 37 from which the output is so connected that the result will now be a low or zero voltage in the output line 10 or 11, designating that the loop 20, 25, 24 is not locked in.

It is also possible to operate the multiplier 33 and the Schmitt trigger 37 in a different way to provide the lock-in signal. If the input signal from the circuit 6 or 7 is in the form of a pulse and the output signal of the VCO 24 is likewise in the form of a pulse, these pulses could be provided directly to the multiplier 33, so that when they overlap there will be a positive signal and when they do not there will be a zero signal. The Schmitt trigger would then be operated so that a positive signal on the connection between the multiplier and the Schmitt trigger would produce a positive output signal on the Schmitt trigger to designate lock-in. The pulse width could correspond to the capture range of the PLL circuit. The pulse width could be made to shorten with increasing tape speed to the extent that might be desirable.

It will therefore be seen that variations and modifications in the implementation of the invention are possible within the inventive concept.

We claim:

1. A method of slow-motion playback of digital video signals by means of a playback equipment for magnetic tape recordings having a rotary carrier around which a magnetic tape is helically looped and on the periphery of which are fixedly mounted an equal number of normal and auxiliary playback magnetic heads having same azimuth orientation, said equipment also having a variable speed tape transport mechanism which is set to produce a tape transport speed which is slower than the speed at which said tape was transported in recording and means for regenerating clock and data signals from the respective output of each of said playback magnetic heads, said playback equipment also having at least one playback channel connectable selectably through switching means to an output of one of said playback magnetic heads said method comprising the steps of:

positioning said playback magnetic heads in said equipment on said rotary carrier at positions such that each of said auxiliary playback heads is allocated to a different one of said normal playback heads for which it can selectively serves as an alternate source of clock and data signals and is offset by half a recording track width, in a fixed position on said rotary carrier, from the normal playback head to which it is so allocated;

modifying said means for regenerating clock and data signals into a form which includes, for the output of each of said playback heads, a phase-locked loop (PLL) circuit having a lock-in state designating output as well as outputs respectively for regenerated clock signals and regenerated data signals;

subjecting signals of all said lock-in state designating outputs to a comparison in which it is determined whether the PLL circuits for said normal playback heads or the PLL circuits for said auxiliary playback heads include the larger number of locked-in PLL circuits, and thereby obtaining playback head selection signal;

activating said switching means, for selection between clock and data signals from said normal playback heads and clock and data signals from said auxiliary playback heads, in accordance with and in response to said playback head selection signal.

2. The method of claim 1, wherein the step of activating said switching means produces a selection between the clock and data signals obtainable from only said normal playback heads and clock and data signals obtainable only from said auxiliary playback heads and connects the signals thereby selected to said at least one playback channel.

3. The method of claim 1, wherein the step of subjecting signals of all said lock-in state designating outputs to a comparison and thereby obtaining a playback head selection signal is performed by use of a read-only memory (15) connected to all of the lock-in state designating outputs of said respective PLL circuits.

4. The method of claim 3, wherein the connections of said respective lock-in state designating outputs to said read-only memory are connected to first address inputs of said read-only memory and wherein the principal data output (D0) of said read-only memory is provided for supplying said playback head section signal, and auxiliary data outputs ($D_n$) are connected with second address inputs ($A_n$) of said read-only memory, for assuring continuance of a previous state of said playback head selection signal when the number of locked-in PLL circuits is the same for the PLL circuits of said normal playback heads and for the PLL circuits of said auxiliary playback heads.

5. Apparatus for playback of digital video signals recorded on oblique tracks of a magnetic tape capable of providing useful playback over a wide range of tape transport speeds slower than the speed used for recording, said apparatus including a rotary headwheel on the periphery of which an equal number of normal and auxiliary magnetic heads having same azimuth orientation are fixedly mounted, means for guiding a magnetic tape in a helical loop around said headwheel for scanning oblique tracks on said tape by said magnetic heads, variable speed mechanism means for advancing said tape around said loop within a range of speeds which includes a range of tape speeds slower than normal tape recording speeds, signal regenerating means connected to each of said playback magnetic heads for regenerating clock frequency pulses and, by means of regenerated clock frequency pulses, regenerating data signals from the output of the particular magnetic head to which said regenerating means is connected, said apparatus also including playback channels each selectively connectable to an output of one of said signal regenerating means and wherein:

among said playback magnetic heads mounted on said headwheel, each of said auxiliary playback heads is allocated to a different one of said normal playback heads for which it selectively serves as an alternative source of clock and data signals and is positioned fixedly on said headwheel so as to be offset by half a recording track width from the normal playback head to which it is allocated;

each of said signal regenerating means of said respective playback heads includes a phase-locked loop (PLL) circuit for deriving regenerated clock signals and having an output for a lock-in state designating signal which indicates whether the PLL circuit is locked in or is unlocked;

means connected to said outputs of said PLL circuits are provided for determining whether the PLL circuits for said normal playback heads or the PLL circuits for said auxiliary playback heads include the larger number of locked-in PLL circuits by processing the lock-in state designating signals of all said PLL circuits to produce a playback head selection signal;

switching means are provided having a control input connected to a source of said playback head selection signal and having selector switch connections for connecting said playback channels either to outputs of signal regenerating means connected to said normal playback heads or to signal regenerating means connected to said auxiliary playback heads, in accordance with the state of said playback head selection signal.

6. The apparatus of claim 5, wherein said means for determining whether the PLL circuits for said normal playback heads or the PLL circuits for said auxiliary playback heads include the larger number of locked-in PLL circuits comprises a fixed logic circuit having first address inputs, second address inputs, a principal data output and auxiliary data outputs, one of said first address inputs being connected to each of said PLL circuit outputs providing a locked-in state designating signal, a said principal data output being connected to said switching means for providing thereto said playback head selection signal, said auxiliary data outputs being respectively connected to said second address inputs at least for preventing a change of said playback head selection signal from being effective when the number of locked-in PLL circuits becomes the same for PLL circuits provided for said normal playback heads and for said PLL circuits provided for said auxiliary playback heads.

* * * * *